(12) United States Patent
Ishii et al.

(10) Patent No.: US 7,195,373 B2
(45) Date of Patent: Mar. 27, 2007

(54) ILLUMINATING DEVICE AND PROJECTION TYPE VIDEO DISPLAY

(75) Inventors: Koji Ishii, Osaka (JP); Hiroki Koba, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 106 days.

(21) Appl. No.: 10/998,969

(22) Filed: Nov. 30, 2004

(65) Prior Publication Data

US 2005/0117337 A1   Jun. 2, 2005

(30) Foreign Application Priority Data

Dec. 1, 2003   (JP) ............................. 2003-401011

(51) Int. Cl.
*F21V 1/00* (2006.01)

(52) U.S. Cl. ..................... 362/241; 362/19; 362/17; 362/227

(58) Field of Classification Search ............... 362/241, 362/19, 16, 17, 227, 235, 346; 355/67; 359/494–497
See application file for complete search history.

(56) References Cited

U.S. PATENT DOCUMENTS 6,392,740 B1 * 5/2002 Shiraishi et al. ............... 355/53
6,697,197 B2 * 2/2004 Sedlmayr ..................... 359/485

FOREIGN PATENT DOCUMENTS

| EP | 1 107 611 A2 | 6/2001 |
| EP | 1 107 611 A3 | 6/2001 |
| JP | 07225430 | 8/1995 |
| JP | 2001-021996 | * 1/2001 |
| JP | 2001-21996 | 1/2001 |

OTHER PUBLICATIONS

European Office Action dated May 31, 2006.

* cited by examiner

*Primary Examiner*—Sandra O'Shea
*Assistant Examiner*—Mark Tsidulko
(74) *Attorney, Agent, or Firm*—Westerman, Hattori, Daniels & Adrian, LLP.

(57) ABSTRACT

Each light path changing member forms a first light flux by reflecting a half of light flux emitted from a particular area (central area or peripheral area) of light source in one direction using a polarizing beam splitter, and forms a second light flux by reflecting the other half of light flux, which has passed through the beam splitter, in the aforementioned direction using the first mirror. Then, each light path changing member transmits a half of a light flux emitted from the other light source and guided by the second mirror in the same direction as that in which the first light flux has been guided using the polarizing beam splitter, and superposes the light flux on the aforementioned first light flux, and reflects the other half of light flux, which has been reflected by the beam splitter, in the aforementioned direction using the first mirror, and superposes the light flux on the second light flux.

23 Claims, 5 Drawing Sheets

ILLUMINATING DEVICE AND PROJECTION TYPE VIDEO DISPLAY

BACKGROUND OF THE INVENTION

Field of the Invention

The present invention relates to an illuminating device and a projection type video display.

There has been proposed an illuminating device with a plurality of light sources which is capable of dispersedly guiding the light emitted from respective light sources to an illuminating surface to illuminate the entire surface of an object to be illuminated using all the light sources (see JP-A-2001-21996).

SUMMARY OF THE INVENTION

However, while the above-mentioned illuminating device is capable of illuminating the entire surface of an object to be illuminated when using all the light sources, the illuminating device is unable to guide all the light emitted from respective light sources to the entire surface of an object to be illuminated. Therefore, if any one of the light sources is run down, there is a disadvantage that slight luminance nonuniformity remains.

In view of the foregoing circumstances, it is an object of the present invention to provide an illuminating device capable of guiding light from each of a plurality of light sources to the entire surface of an object to be illuminated and a projection type video display equipped with such an illuminating device.

In order to solve the above-mentioned problem, an illuminating device according to the present invention is characterized in that a plurality of light path changing members formed respectively by combining light reflecting members which reflect subparallel (or substantially parallel) light incident thereon and light separating members which reflect a half and transmit the other half of subparallel (substantially parallel) light incident thereon are arranged between two light sources arranged opposite each other, and the respective light path changing members receive two light fluxes emitted respectively from particular corresponding areas of two light sources, superpose one light flux on the other light flux in order to form a resulting light flux occupying the areas larger than those from which the light fluxes were originally emitted, and emit the resulting light flux in one direction, thereby light emitted from respective light sources is guided to the entire surface of an object to be illuminated.

In the abovementioned configuration, light emitted from the center areas of the light sources is guided to the center of an object to be illuminated, and light emitted from the peripheral areas of the light sources is guided to the peripheral area of an object to be illuminated, and moreover, light emitted from respective light sources is guided to the entire surface of an object to be illuminated.

In an illuminating device of the above-mentioned configuration, it may be configured that each light reflecting member comprises a first light reflecting member which reflects a light flux emitted from one light source and passed through the light separating member and a second light reflecting member which reflects a light flux emitted from the other light source to guide the light flux to the light separating member. The aforementioned each light path changing member forms a first light flux by reflecting a half of a first original light flux which is emitted from one light source in the aforementioned direction using the light separating member, and forms a second light flux adjoining the first light flux by reflecting the other half of the first original light flux, which has passed through the light separating member, in the aforementioned one direction using the first light reflecting member, and transmits a half of a second original light flux emitted from the other light source and guided by the second light reflecting member in the same direction as that in which the first light flux has been guided using said light separating member to superpose the transmitted light flux on the first light flux, and reflects the other half of the second original light flux, which has been reflected by the light separating member, in the aforementioned one direction using the first light reflecting member to superpose the reflected light flux on the second light flux.

Also, it may be configured that a plurality of illuminating devices are provided as component illuminating devices, and a plurality of light path changing members formed respectively by combining light reflecting members which reflect subparallel (or substantially parallel) light incident thereon and light separating members which reflect a half and transmit the other half of subparallel (or substantially parallel) light incident thereon are arranged between two component illuminating devices arranged opposite each other. The respective light path changing members receive two light fluxes emitted respectively from particular corresponding areas of two component illuminating devices, superpose one light flux on the other light flux to form a resulting light flux occupying the areas larger than those from which the light fluxes were originally emitted, and emit the resulting light flux in one direction. Thereby light emitted from respective component illuminating devices is guided to the entire surface of an object to be illuminated.

In these illuminating devices, light reflecting members which respectively form a part of adjoining light path changing members are arranged next to each other, and the adjacent light reflecting members may make a v-shape by putting edges of respective members together. Also, light reflecting members which respectively form a part of adjoining light path changing members are arranged next to each other, and the adjacent light reflecting members may be composed of two mirror surfaces of a triangle pole member. It is preferable that a fly's eye lens is provided as an illuminating device, and light separating members and the light reflecting members are arranged so that their edges are located on the position corresponding to the valley portions between lens elements of the fly's eye lens.

The light separating member may be a half mirror or a polarizing beam splitter.

A projection type video display which optically modulates light emitted from an illuminating device using a light valve to project image light obtained by the optical modulation according to the present invention is characterized by being provided with any one of aforementioned illuminating devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
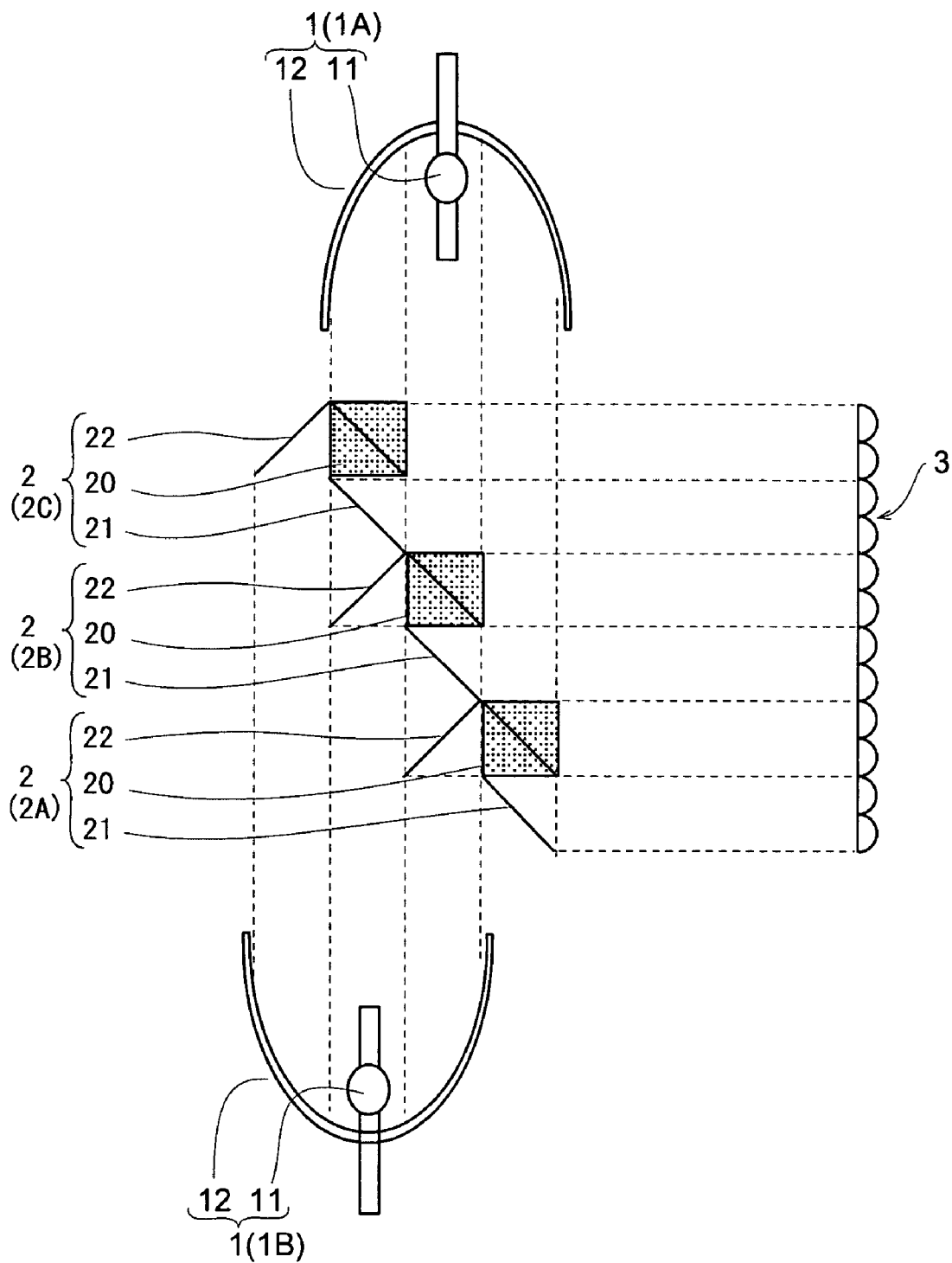
FIG. 1 is an schematic view showing an illuminating device according to the present invention.
Figure 2:
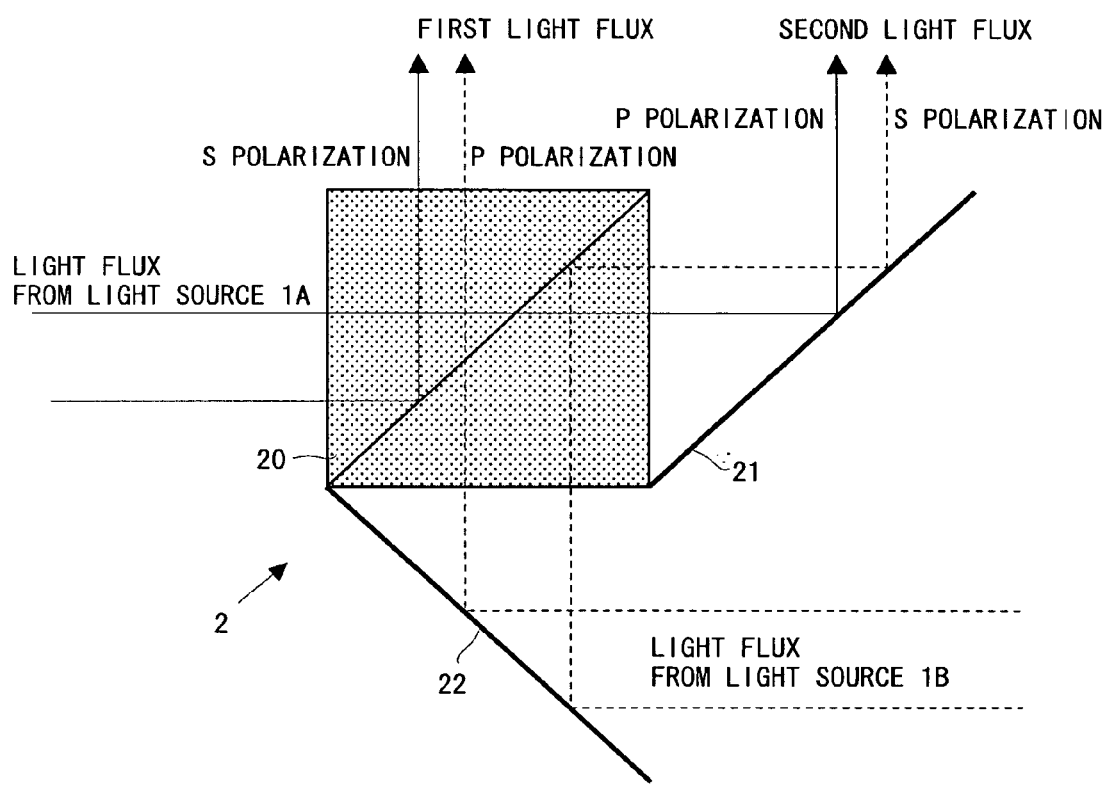
FIG. 2 is an schematic view showing change of optical paths.
Figure 3:
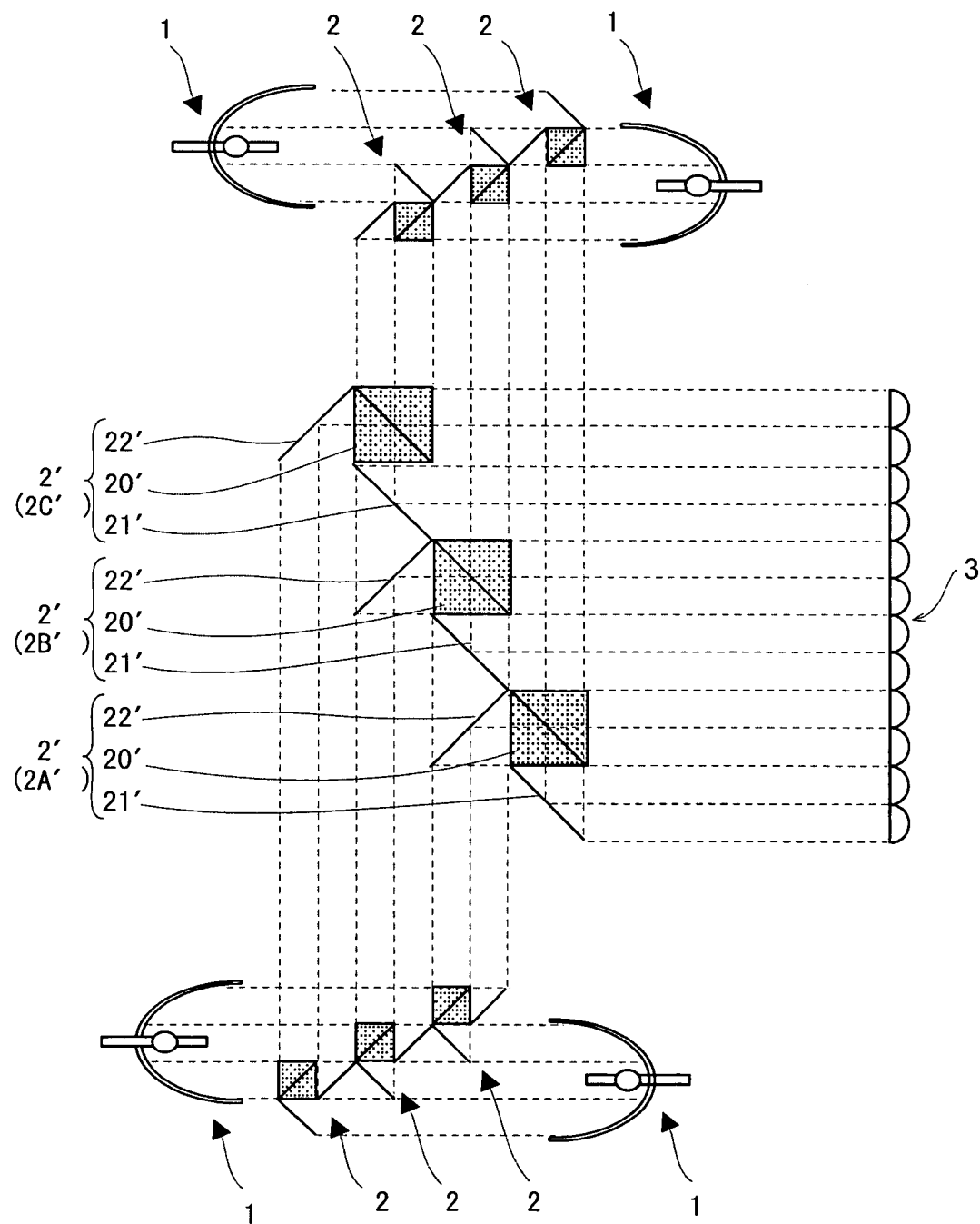
FIG. 3 is an schematic view showing an illuminating device constructed by combining two illuminating devices shown in FIG. 1.

An embodiment according to the present invention is now described referring to FIGS. 1 to 3.

An illuminating device shown in FIG. 1 comprises two light sources 1, 1 (1A, 1B) arranged opposite each other and three sets of light path changing members 2 (2A, 2B, 2C) arranged between the light sources 1A and 1B. The light sources 1A and 1B are so arranged that the center of their respective emitted light is shifted from each other. Each light source 1 is provided with a light emitter 11 which comprises an ultra-high pressure mercury lamp or a metal halide lamp and the like, and a parabolic concave mirror 12 which changes the light emitted from the light emitter 11 into subparallel (or substantially parallel) light and emits the subparallel light (substantially parallel. The light path changing member 2B is arranged so that it receives a light flux emitted from the center area of each light source 1, and the light path changing members 2A and 2C are arranged so that they receive light fluxes emitted from the peripheral area of each light source 1.

Each light path changing member 2 is formed by combining a polarizing beam splitter 20 which reflects a half and transmits the other half of subparallel (substantially parallel) light incident thereon, a first mirror 21, and a second mirror 22. A separating surface of the polarizing beam splitter 20 is so arranged that it is inclined 45 degrees to the light axis of the light source 1, the first mirror 21 is arranged parallel to the separating surface (inclined 45 degrees to the aforementioned light axis), and the second mirror 22 is arranged perpendicularly to the first mirror 21. Each light path changing member 2 receives two light fluxes emitted respectively from particular corresponding areas of two light sources 1A and 1B and superposes one light flux on the other light flux, thereby forms a light flux occupying the area twice as large as the particular area and emits the formed light flux in one direction (the direction in which a fly's eye lens 3 is located). Accordingly, light emitted from respective light sources 1A and 1B is guided to the entire surface of the fly's eye lens 3 as an object to be illuminated.

More particularly, each light path changing member 2 forms a first light flux by reflecting a half of a light flux emitted from a particular area (center area or peripheral area) of one light source 1A in the aforementioned direction using the polarizing beam splitter 20, and then, forms a second light flux adjoining the first light flux by reflecting the other half of the light flux emitted from a particular area of one light source 1A (which has passed through the beam splitter 20) in the afore-mentioned direction using the first mirror 21. Furthermore, each light path changing member transmits a half of a light flux emitted from the other light source 1B and then guided by the second mirror 22 in the same direction as that in which the first light flux has been guided using the polarizing beam splitter 20, and superposes the light flux on the aforementioned first light flux. Then, each light path changing member reflects the other half of light flux, which has been reflected by polarizing beam splitter 20, in the same direction using the first mirror 21 and superposes the light flux on the second light flux.

The polarizing beam splitter 20 transmits P polarization of light from the light source 1 and reflects S polarization. Therefore, as shown in FIG. 2, S polarization of the light flux emitted from a particular area of the light source 1A becomes the first light flux, and P polarization becomes the second light flux. On the other hand, P polarization of the light flux emitted from a particular area of the light source 1B becomes the first light flux, and S polarization becomes the second light flux.

Thus, the light from the light sources 1A and 1B is respectively superposed on each other by three light path changing members 2A, 2B and 2C to be guided onto fly's eye lens 3, and furthermore, the respective emitted light from the light sources 1A and 1B can be guided to reach the entire surface of fly's eye lens 3. The light path changing member 2B superposes the light fluxes emitted respectively from the center areas of the light sources 1A and 1B, to guide the light fluxes to the center area of the fly's eye lens 3. Similarly, the light path changing members 2A and 2C superpose the light fluxes emitted respectively from the peripheral areas of the light sources 1A and 1B, to guide the light fluxes to the peripheral area of the fly's eye lens 3.

In the adjoining light path changing members 2A and 2B, the second mirror 22 is arranged next to the first mirror 21 such that edges of respective adjoining mirrors are put together to make a v-shape. Also in the adjoining light path changing members 2B and 2C, the second mirror 22 is arranged next to the first mirror 21 such that edges of respective adjoining mirrors are put together to make a v-shape. Such arrangement enables the mirrors 21 and 22 to be integrated. Such integration enables the number of members to be reduced. The polarizing beam splitter 20, the mirror 21, and the mirror 22 are arranged so that their edges are located on the position corresponding to valley portions existing between lens elements of fly's eye lens 3 to avoid malfunction that may occur when the aforementioned edges are located on the position corresponding to the convex lenses of the fly's eye lens 3.

An illuminating device shown in FIG. 3 comprises two illuminating devices shown in FIG. 1 (hereinafter referred to as component illuminating devices) and is constructed by arranging three light path changing members 2A', 2B' and 2C' between the two component illuminating devices. The two component illuminating devices are arranged such that their light axes (after the light paths were changed by the light path changing members 2A, 2B and 2C) are shifted with respect to each other. The fly's eye lens 3 is so arranged that the normal lines on the light incident side are perpendicular to the aforementioned light axes after the light paths were changed. This illuminating device shown in FIG. 3 realizes a four light type illuminating device by using the illuminating device shown in FIG. 1 as light sources and superposing light fluxes emitted from respective light sources (component illuminating devices) by using aforementioned light path changing members 2A', 2B' and 2C'. Also in this illuminating device shown in FIG. 3, in the adjoining light path changing members 2A' and 2B', the second mirror 22' is arranged next to the first mirror 21' such that one side edge of respective adjoining mirrors are put together to make a v-shape. In adjoining light path changing members 2B' and 2C', the second mirror 22' is arranged next to the first mirror 21' such that the edges of respective adjoining mirrors are put together to make a v-shape. The polarizing beam splitter 20', the mirror 21', and the mirror 22' are arranged so that their edges are located on the position corresponding to valley portions existing between lens elements of the fly's eye lens 3.

Embodiment 2

Figure 4:
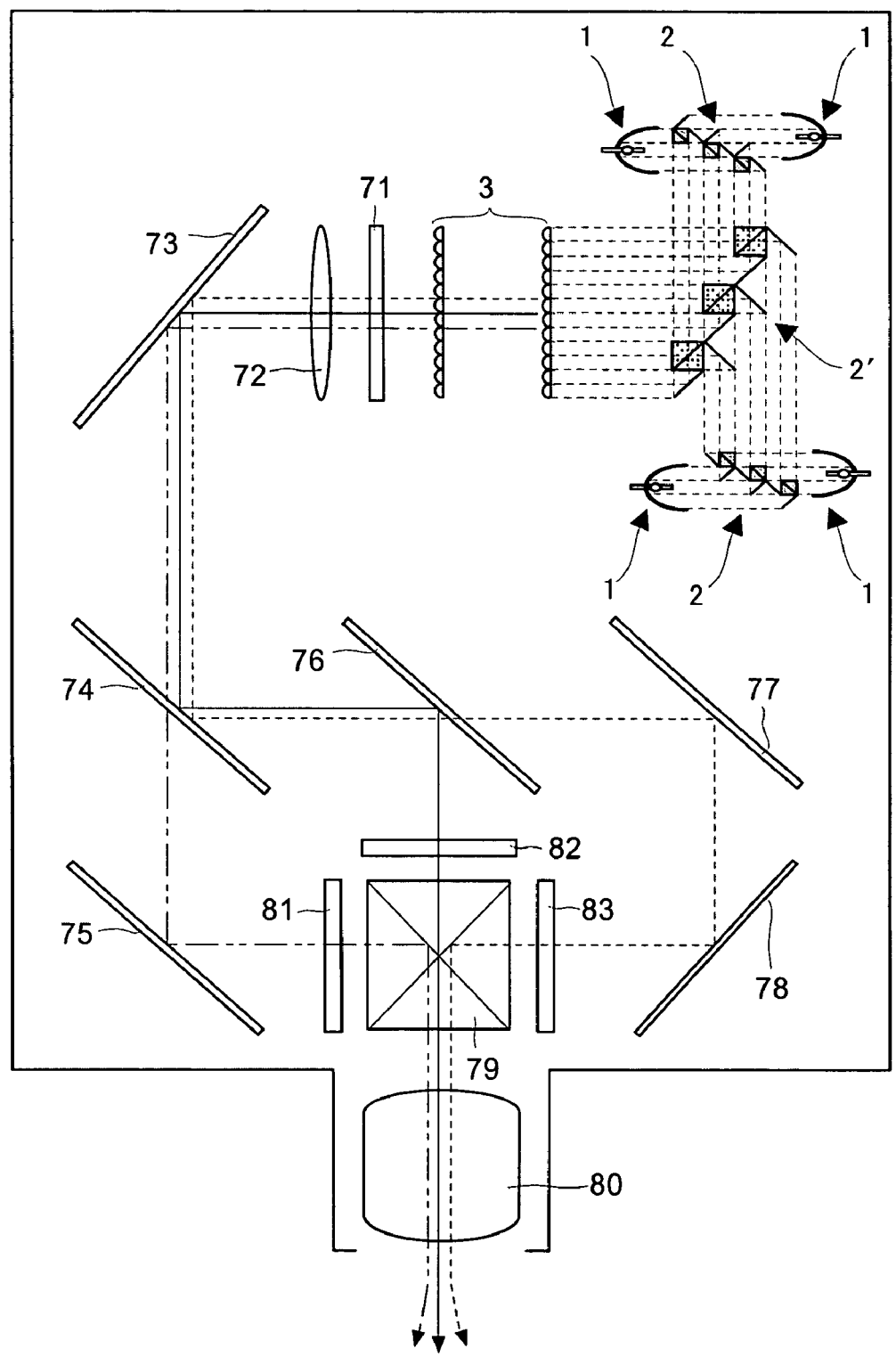
FIG. 4 is an schematic view showing a projection type video display equipped with an illuminating device shown in FIG. 3.
Figure 5:
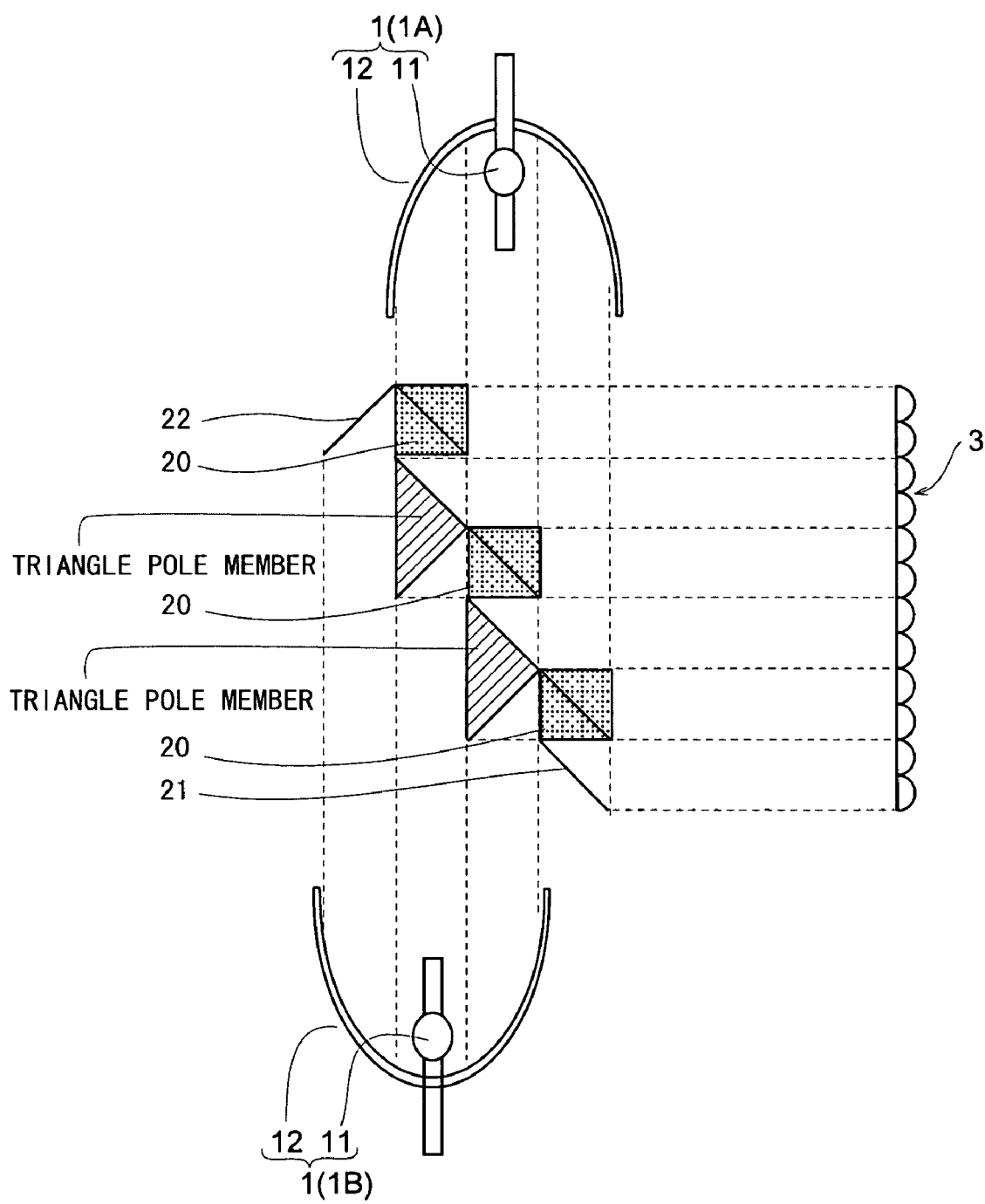
FIG. 5 is a schematic view showing a variation of the illuminating device of FIG. 1.

A projection type video display according to an embodiment of the present invention is now described referring to FIG. 4. FIG. 4 shows a liquid crystal projector equipped with an illuminating device shown in FIG. 3. White light emitted from the illuminating device is applied to a pair of fly's eye lenses 3 and reaches a polarization conversion system 71 through the fly's eye lenses 3. A pair of fly's eye lenses 3 is constructed such that the respective lens portions facing each other illuminate the whole surface of the liquid crystal panel described later. Accordingly the fly's eye lenses even off the local luminance nonuniformity existing in the light emitted from the illuminating device, thereby decreasing the difference between the light amount at the screen center and the light amount at the screen perimeter.

The polarization conversion system 71 is composed of a polarizing beam splitter array (hereinafter referred to as a PBS array). The PBS array comprises polarization separating surfaces and a retardation plate (1/2λ plate). The respective polarization separating surfaces of the PBS array transmit, for example, the P polarization of the light from the fly's eye lenses 3 and change the light path of the S polarization by 90 degree. The S polarization having a changed light path is reflected by an adjacent polarization separating surface and is emitted as it is. On the other hand, the P polarization passed through the polarization separating surface is converted into the S polarization by the aforementioned retardation plate provided in the front side (the light emitting side) thereof and is emitted. Namely, in this case, almost all the light is converted into the S polarization.

The light converted into identical polarization through the polarization conversion system 71 passes through a condenser lens 72, and is guided to a first dichroic mirror 74 after its light path is changed by 90 degree by a total reflection mirror 73. A first dichroic mirror 74 transmits light in a red wavelength band and reflects light in a cyan (green+blue) wavelength band. The light in the red wavelength band which has passed through the first dichroic mirror 74 is reflected by a total reflection mirror 75 to be guided to a transmission type liquid crystal panel for red light 81 and is optically modulated by passing therethrough. On the other hand, the light in a cyan wavelength band which has been reflected by the first dichroic mirror 74 is guided to a second dichroic mirror 76.

The second dichroic mirror 76 transmits light in a blue wavelength band and reflects light in a green wavelength band. The light in a green wavelength band reflected by the second dichroic mirror 76 is guided to a transmission type liquid crystal panel for green light 82 to be optically modulated by passing therethrough. The light in a blue wavelength band which has passed through the second dichroic mirror 76 is reflected by total reflection mirrors 77 and 78 to be guided to a transmission type liquid crystal panel for blue light 83 and is optically modulated by passing therethrough.

The modulated light (image light in respective colors) obtained by passing respectively through the liquid crystal panels 81, 82, and 83 is combined by a dichroic prism 79 to be color image light. This color image light is enlarged by a projection lens 80 and projected on a screen which is not shown.

Furthermore, the configuration is not limited to one in which the mirrors in an illuminating device are arranged such that edges of respective mirrors are put together to make a v-shape as shown in FIG. 1 and FIG. 3. Instead of such mirrors, a triangle pole member may be provided and its two adjoining surfaces may be constructed to be mirror surfaces. There is an advantage that the configuration in which a triangle pole member is used is easier to construct, compared with the configuration in which two mirrors are arranged with their edges are put together to make a v-shape. Though the above-mentioned liquid crystal projector is provided with four lights using an illuminating device shown in FIG. 3, the liquid crystal projector may be provided with two lights using an illuminating device shown in FIG. 1. Both of the illuminating devices shown in FIG. 1 and FIG. 3 are capable of guiding light from respective light sources to the entire surface of fly's eye lens 3 as an object to be illuminated. Therefore, compared with the conventional configuration in which light emitted from respective light sources is guided to an object to be illuminated in a striped shape, luminance nonuniformity created when any one of a plurality of light sources is run down will be extremely faint, thereby image projection can be continued under good condition. Furthermore, it is possible to use energy saving mode by putting off some of the light sources intentionally.

In the above-mentioned configurations, the number of the light sources is two or four, but the number is not limited to this as far as the number is more than one. Also in the above-mentioned configuration, three light path changing members are arranged between the light sources arranged opposite each other, but the number of light path changing members is not limited to three. Furthermore, both of the light sources arranged opposite each other are white light sources, but the light sources are not limited to white light sources. For example, one light source may be a white light source, and the other light source may be an auxiliary light source (it may be a lamp light source or a solid state light source using light emitting diode, or the like) to make up for light in a particular wavelength of the white light source. As a light separating member, a polarizing beam splitter is used. Instead of the polarizing beam splitter, a half mirror may be used. As a projection type video display, three-panel liquid crystal projector is used, but it may be a single panel liquid crystal projector. Moreover, a light valve other than liquid crystal panel may be used.

As described above, an illuminating device according to the present invention, light emitted from respective light sources can be guided to the entire surface of an object to be illuminated. Therefore, a projection type video display equipped with the illuminating device has such an advantage that it will hardly cause luminance nonuniformity even when any one of light sources is run down or cut off intentionally for energy saving.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an illuminating device,
    a plurality of light path changing members formed respectively by combining light reflecting members which reflect subparallel light incident thereon and light separating members which reflect a half and transmit the other half of subparallel light incident thereon are arranged between two light sources arranged opposite and offset from each other;

and respective light path changing members receive two light fluxes emitted respectively from particular corresponding areas of two light sources and superpose one light flux on the other light flux to form a resulting light flux occupying the areas larger than those from which the light fluxes were originally emitted and emit the resulting light flux in one direction, thereby light emitted from respective light sources is guided to the entire surface of an object to be illuminated.

2. An illuminating device according to claim 1, wherein said each light reflecting member comprises a first light reflecting member which reflects a light flux emitted from one light source and passed through said light separating member and a second light reflecting member which reflects a light flux emitted from the other light source to guide the light flux to said light separating member, and said each light path changing member forms a first light flux by reflecting a half of a first original light flux which is emitted from one light source in said one direction using said light separating member, and forms a second light flux adjoining the first light flux by reflecting the other half of the first original light flux, which has passed through said light separating member, in said one direction using said first light reflecting member, and transmits a half of a second original light flux emitted from the other light source and guided by said second light reflecting member in the same direction as that in which the first light flux has been guided using said light separating member to superpose the transmitted light flux on the first light flux, and reflects the other half of the second original light flux, which has been reflected by said light separating member, in said one direction using said first light reflecting member to superpose the reflected light flux on the second light flux.

3. An illuminating device comprising a plurality of illuminating devices according to claim 2 as component illuminating devices, wherein a plurality of light path changing members formed respectively by combining light reflecting members which reflect subparallel light incident thereon and light separating members which reflect a half and transmit the other half of subparallel light incident thereon are arranged between two component illuminating devices arranged opposite each other, and the respective light path changing members receive two light fluxes emitted respectively from particular corresponding areas of two component illuminating devices and superpose one light flux on the other light flux to form a resulting light flux occupying the areas larger than those from which the light fluxes were originally emitted and emit the resulting light flux in one direction, thereby light emitted from respective component illuminating devices is guided to the entire surface of an object to be illuminated.

4. An illuminating device according to claim 3, wherein light reflecting members which respectively form a part of adjoining light path changing members are arranged next to each other, and said adjacent light reflecting members make a v-shape by putting edges of respective members together.

5. An illuminating device according to claim 3, wherein light reflecting members which respectively form a part of adjoining light path changing members are arranged next to each other, and said adjacent light reflecting members are composed of two adjoining mirror surfaces of a triangle pole member.

6. An illuminating device according to claim 2, wherein light reflecting members which respectively form a part of adjoining light path changing members are arranged next to each other, and said adjacent light reflecting members make a v-shape by putting edges of respective members together.

7. An illuminating device according to claim 2, wherein light reflecting members which respectively form a part of adjoining light path changing members are arranged next to each other, and said adjacent light reflecting members are composed of two adjoining mirror surfaces of a triangle pole member.

8. An illuminating device comprising a plurality of illuminating devices according to claim 1 as component illuminating devices, wherein a plurality of light path changing members formed respectively by combining light reflecting members which reflect subparallel light incident thereon and light separating members which reflect a half and transmit the other half of subparallel light incident thereon are arranged between two component illuminating devices arranged opposite each other, and the respective light path changing members receive two light fluxes emitted respectively from particular corresponding areas of two component illuminating devices and superpose one light flux on the other light flux to form a resulting light flux occupying the areas larger than those from which the light fluxes were originally emitted and emit the resulting light flux in one direction, thereby light emitted from respective component illuminating devices is guided to the entire surface of an object to be illuminated.

9. An illuminating device according to claim 8, wherein light reflecting members which respectively form a part of adjoining light path changing members are arranged next to each other, and said adjacent light reflecting members make a v-shape by putting edges of respective members together.

10. An illuminating device according to claim 8, wherein light reflecting members which respectively form a part of adjoining light path changing members are arranged next to each other, and said adjacent light reflecting members are composed of two adjoining mirror surfaces of a triangle pole member.

11. An illuminating device according to claim 1, wherein light reflecting members which respectively form a part of adjoining light path changing members are arranged next to each other, and said adjacent light reflecting members make a v-shape by putting edges of respective members together.

12. An illuminating device according to claim 1, wherein light reflecting members which respectively form a part of adjoining light path changing members are arranged next to each other, and said adjacent light reflecting members are composed of two adjoining mirror surfaces of a triangle pole member.

13. An illuminating device according to, claim 1 wherein a fly's eye lens is provided as an object to be illuminated, and said light separating members and the light reflecting members are arranged so that their edges are located on the position corresponding to the valley portions between lens elements of the fly's eye lens.

14. An illuminating device according to claim 13, wherein said light separating members are half mirrors.

15. In a projection type video display which optically modulates light emitted from an illuminating device using a light valve to project image light obtained by said optical modulation, wherein
an illuminating device according to claim 14 is provided as said illuminating device.

16. An illuminating device according to claim 13, wherein said light separating members are polarizing beam splitters.

17. In a projection type video display which optically modulates light emitted from an illuminating device using a light valve to project image light obtained by said optical modulation, wherein
an illuminating device according to claim 16 is provided as said illuminating device.

18. In a projection type video display which optically modulates light emitted from an illuminating device using a light valve to project image light obtained by said optical modulation, wherein
an illuminating device according to claim 13 is provided as said illuminating device.

19. An illuminating device according to, claim 1 wherein said light separating members are half mirrors.

20. In a projection type video display which optically modulates light emitted from an illuminating device using a light valve to project image light obtained by said optical modulation, wherein
an illuminating device according to claim 19 is provided as said illuminating device.

21. An illuminating device according to, claim 1 wherein said light separating members are polarizing beam splitters.

22. In a projection type video display which optically modulates light emitted from an illuminating device using a light valve to project image light obtained by said optical modulation, wherein
an illuminating device according to claim 21 is provided as said illuminating device.

23. In a projection type video display which optically modulates light emitted from an illuminating device using a light valve to project image light obtained by said optical modulation, wherein
an illuminating device according to claim 1 is provided as said illuminating device.

* * * * *